March 2, 1926. 1,575,301
J. L. W. RACH
BAKING MACHINE
Filed August 12, 1922   13 Sheets-Sheet 1

Inventor
J.L.W. Rach

March 2, 1926.
J. L. W. RACH
BAKING MACHINE
1,575,301
Filed August 12, 1922   13 Sheets-Sheet 2
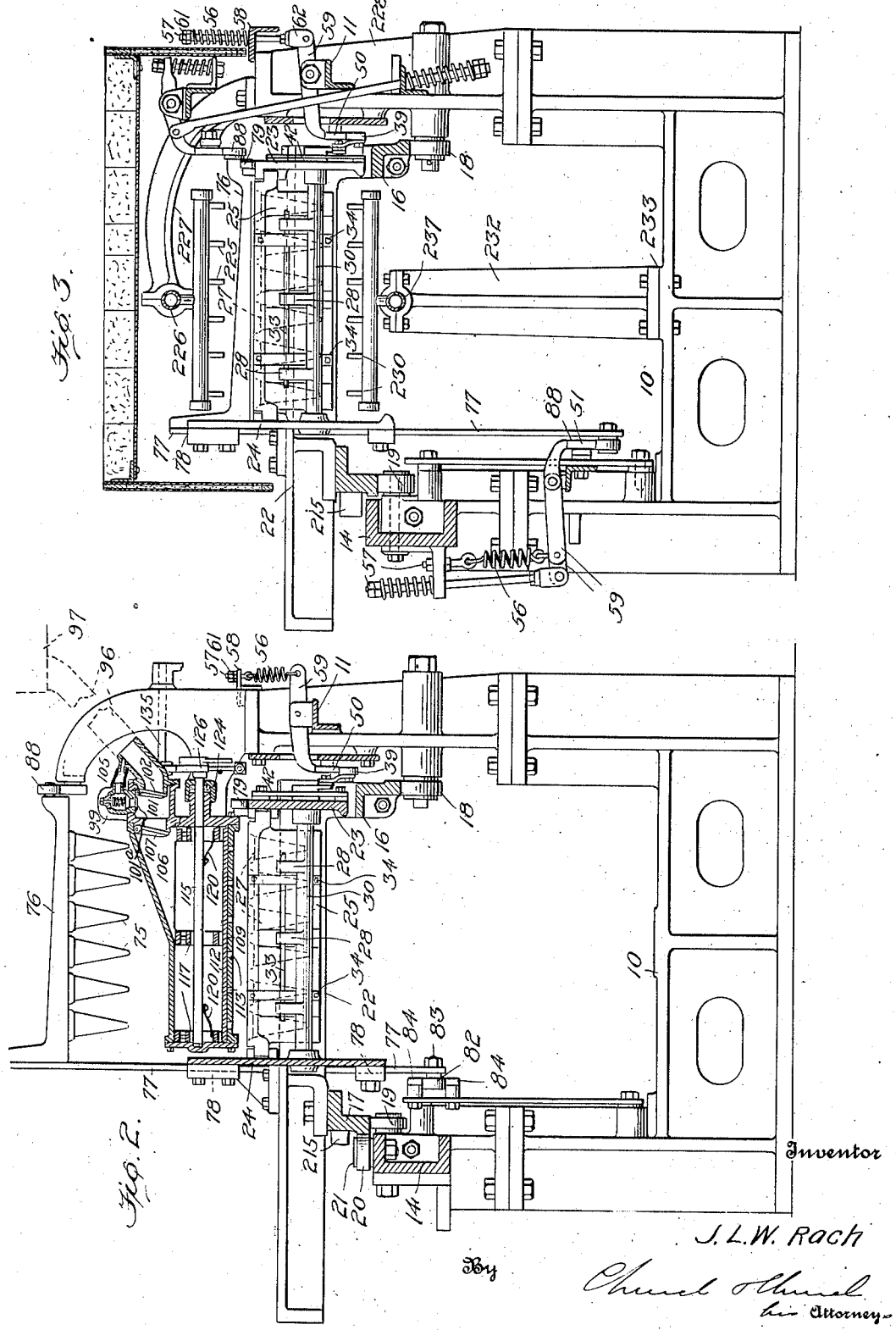
Inventor
J.L.W. Rach
By
his Attorney

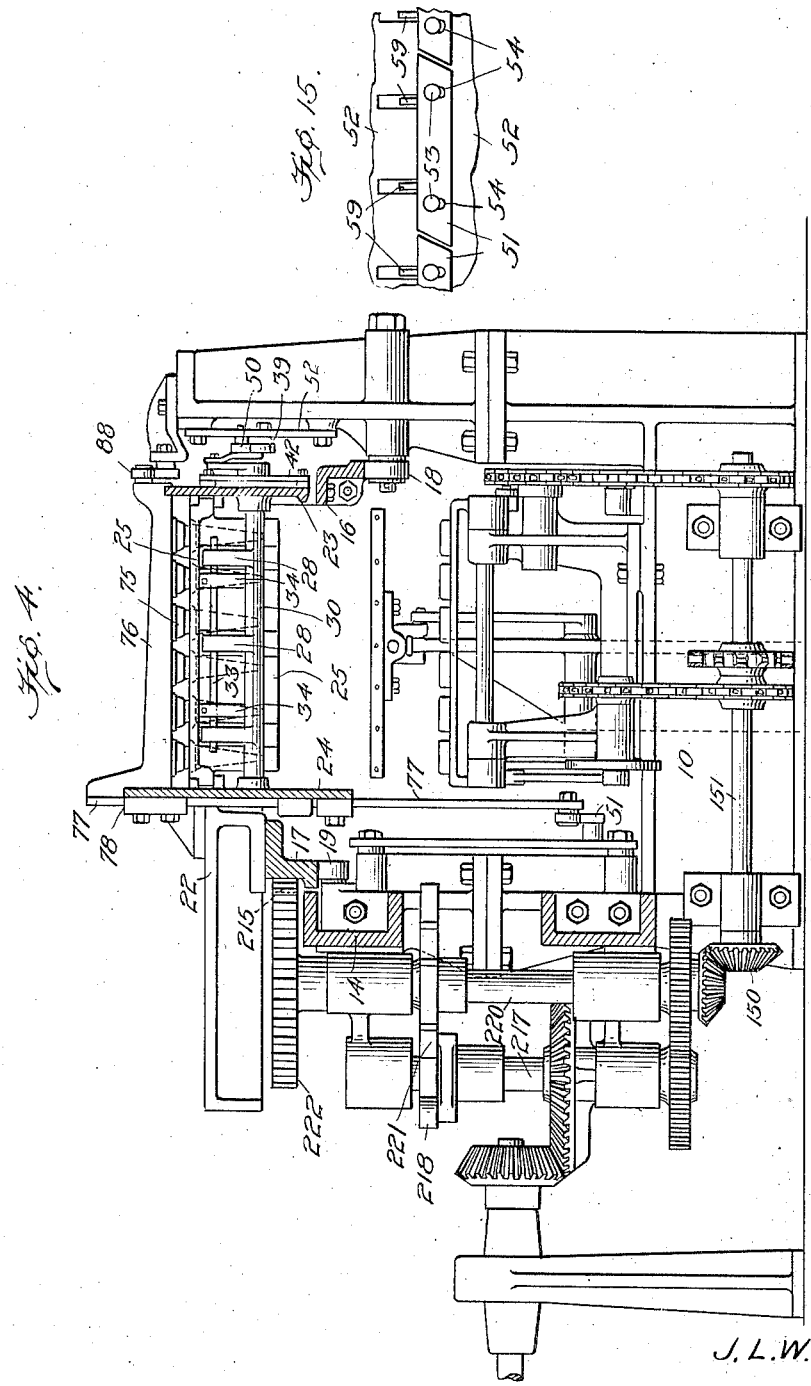

March 2, 1926.  
J. L. W. RACH  
1,575,301  
BAKING MACHINE  
Filed August 12, 1922  
13 Sheets-Sheet 4

Inventor  
J. L. W. Rach  
By Church & Church  
his Attorney

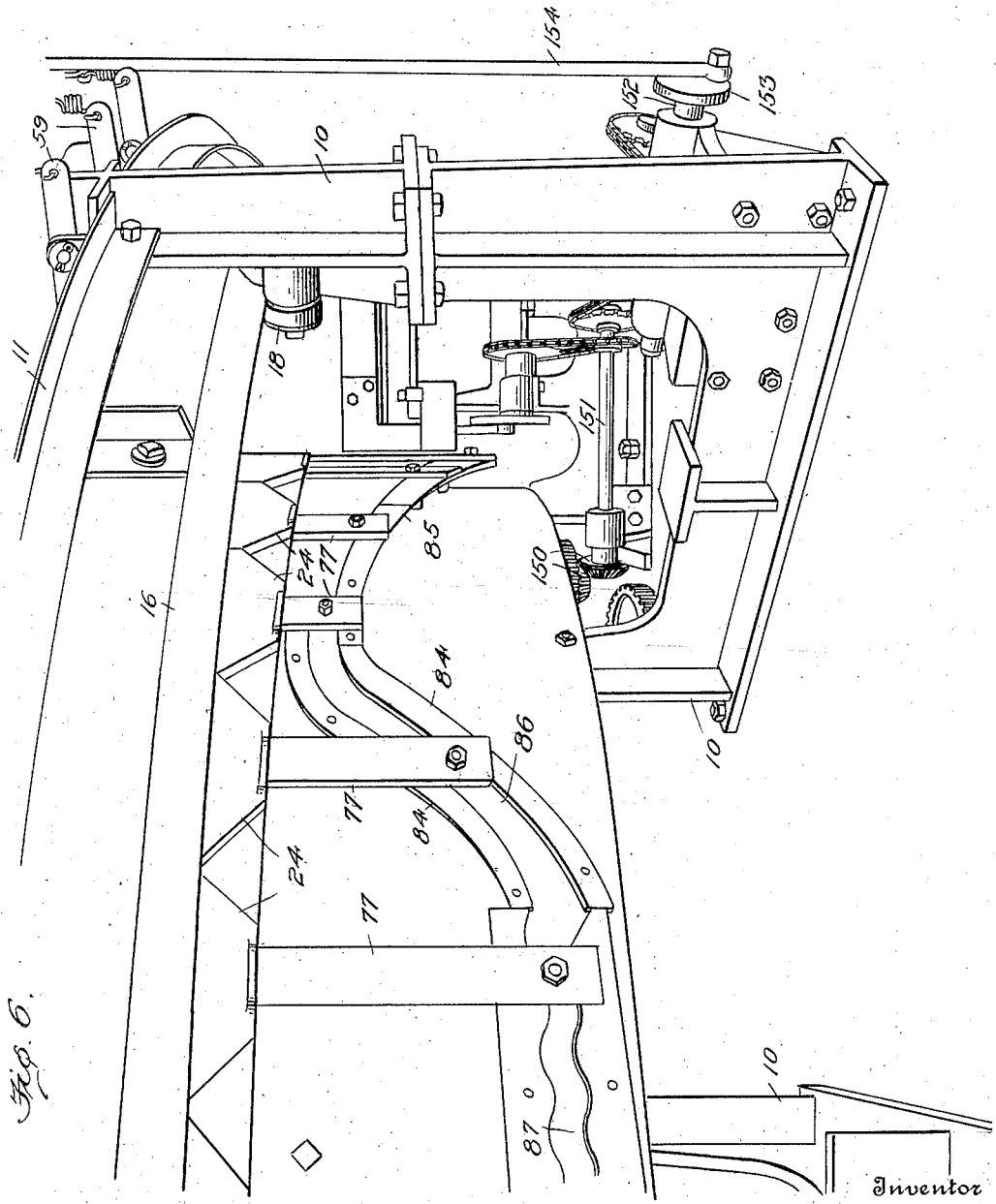

March 2, 1926.
J. L. W. RACH
BAKING MACHINE
Filed August 12, 1922   13 Sheets-Sheet 6
1,575,301
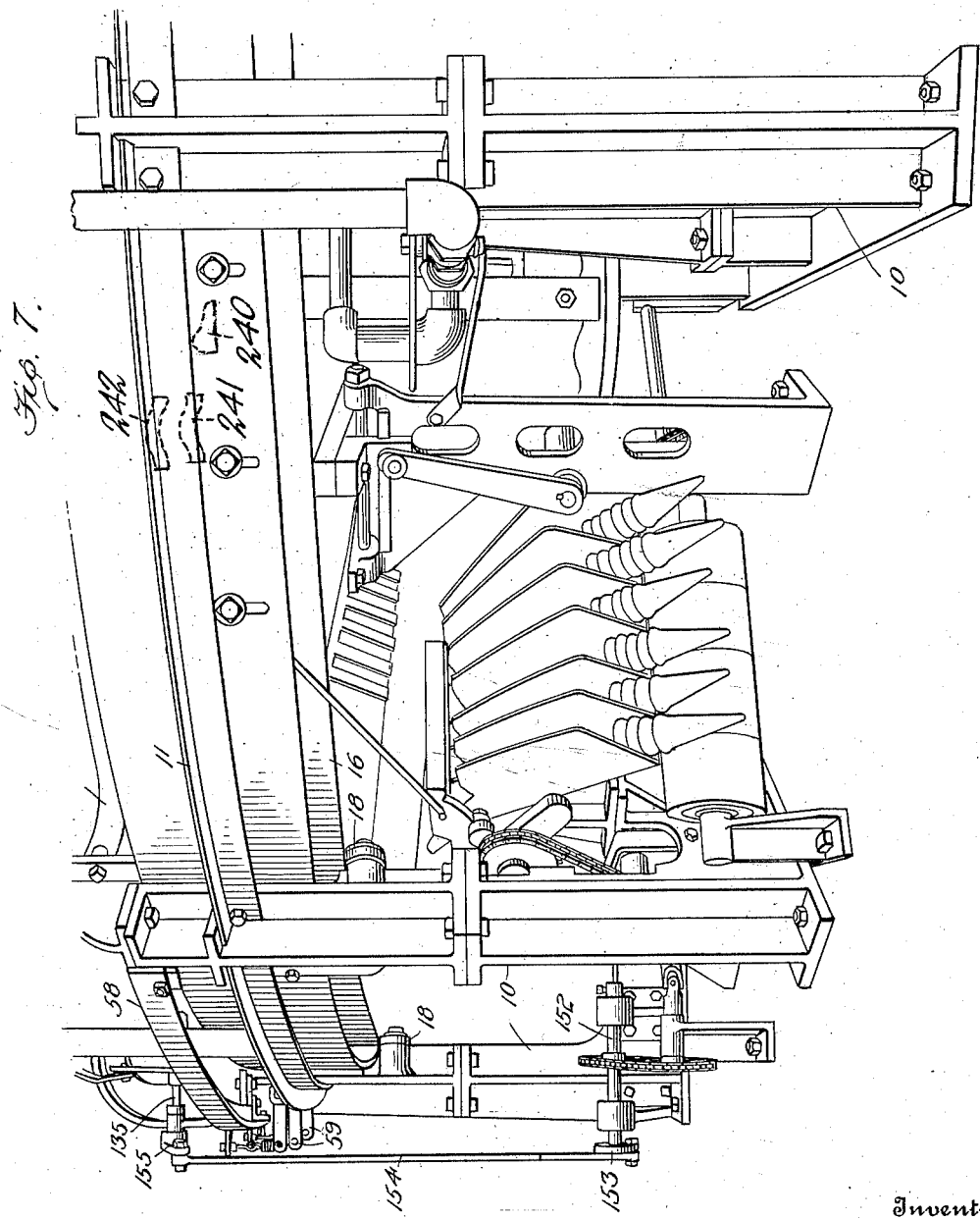
Inventor
J. L. W. Rach
By
his Attorneys

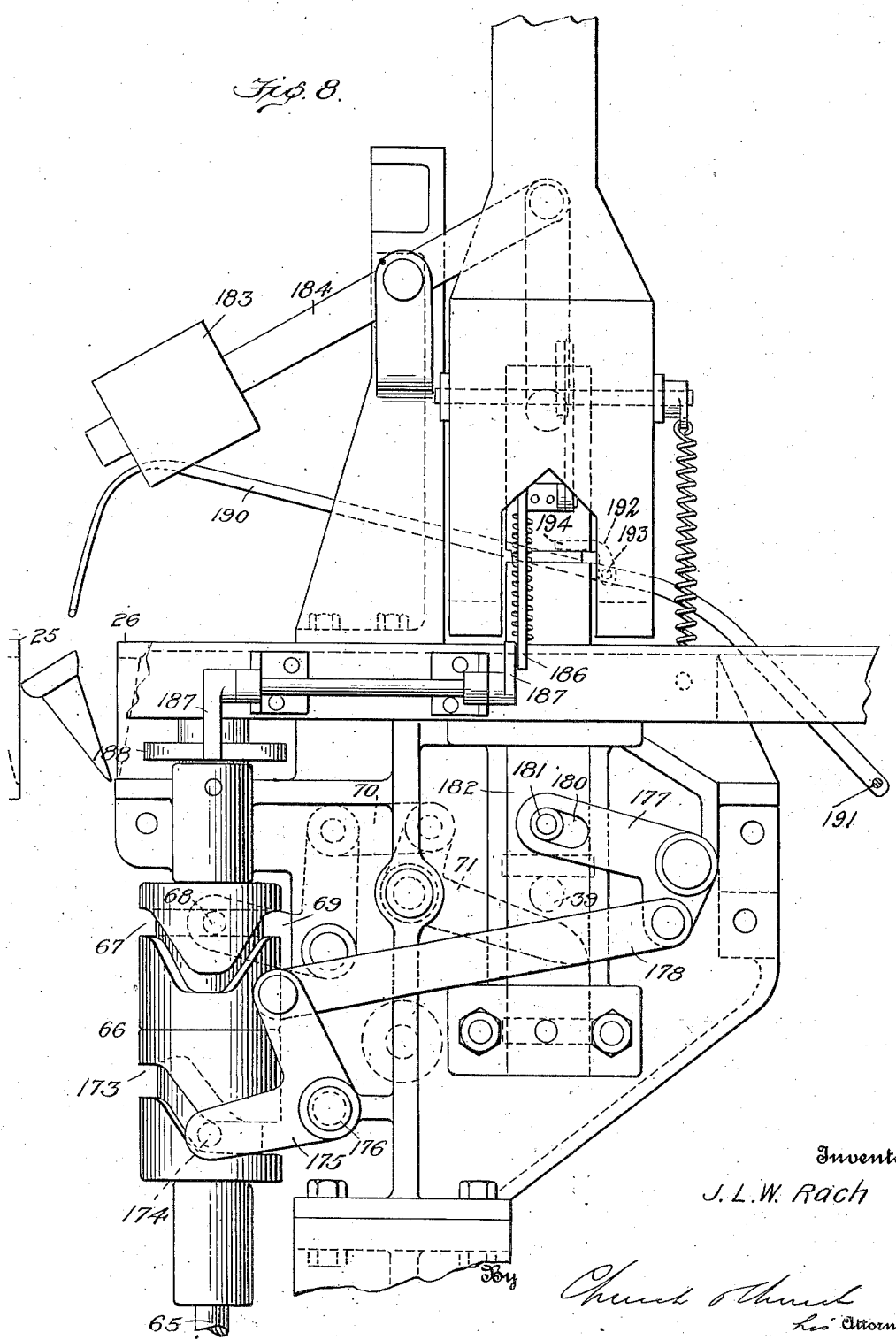

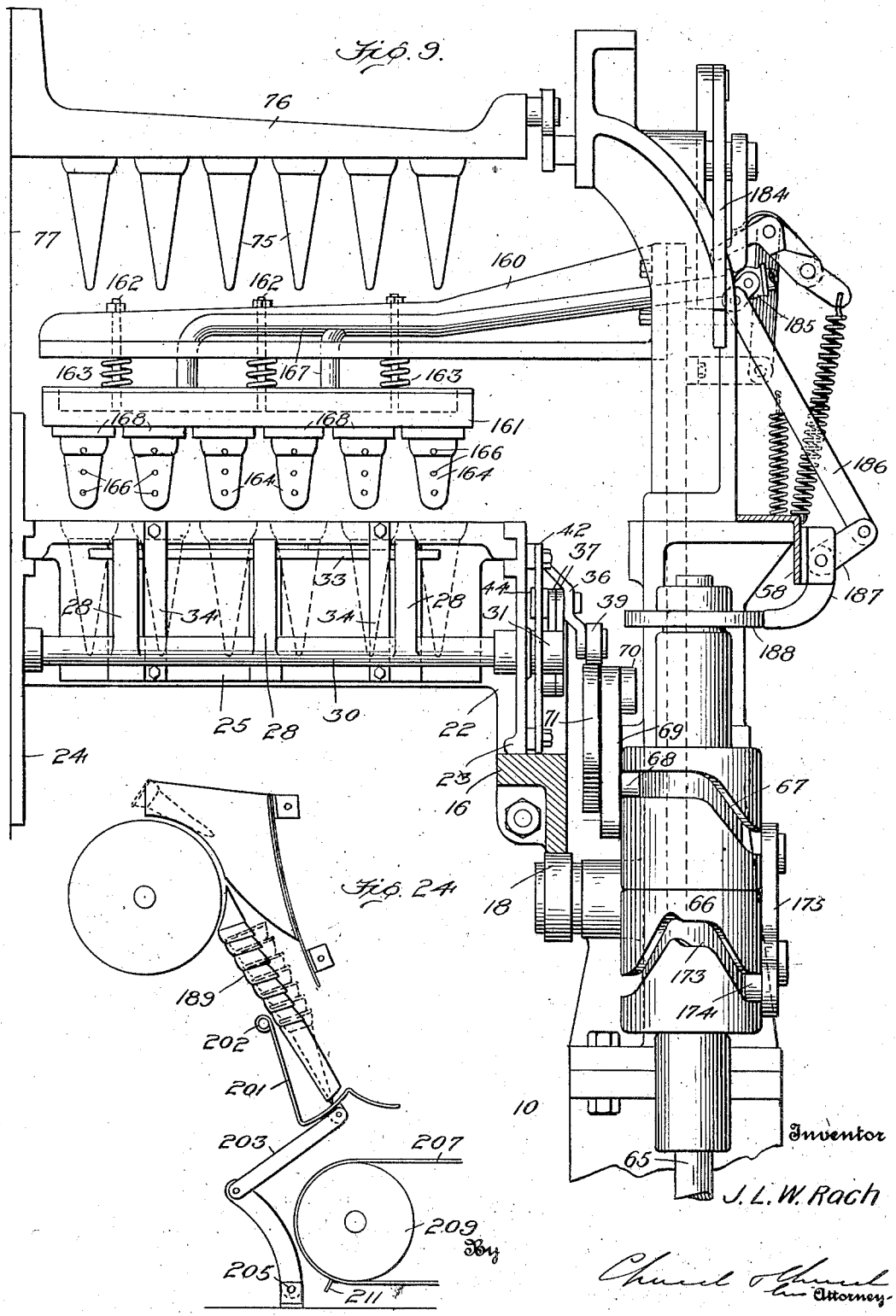

March 2, 1926.
J. L. W. RACH
1,575,301
BAKING MACHINE
Filed August 12, 1922    13 Sheets-Sheet 9
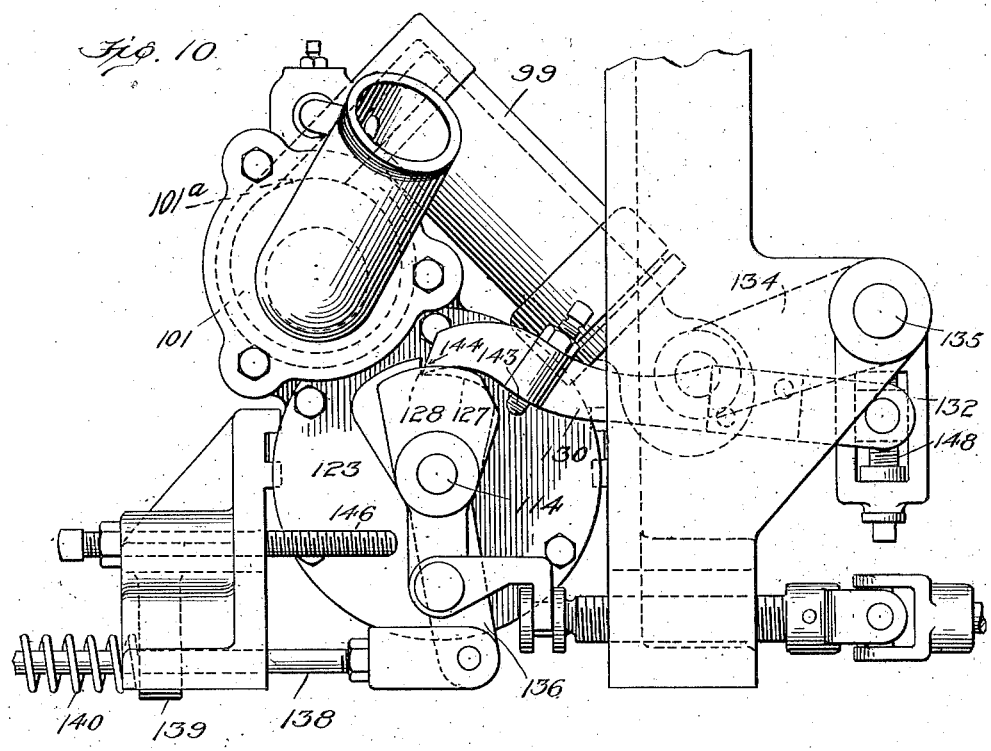
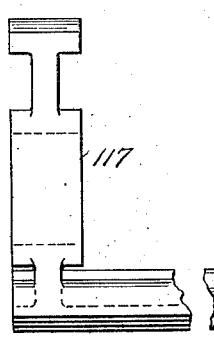
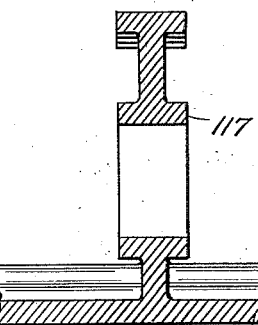
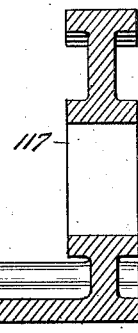
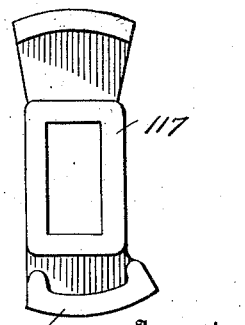
Inventor
J.L.W. Rach

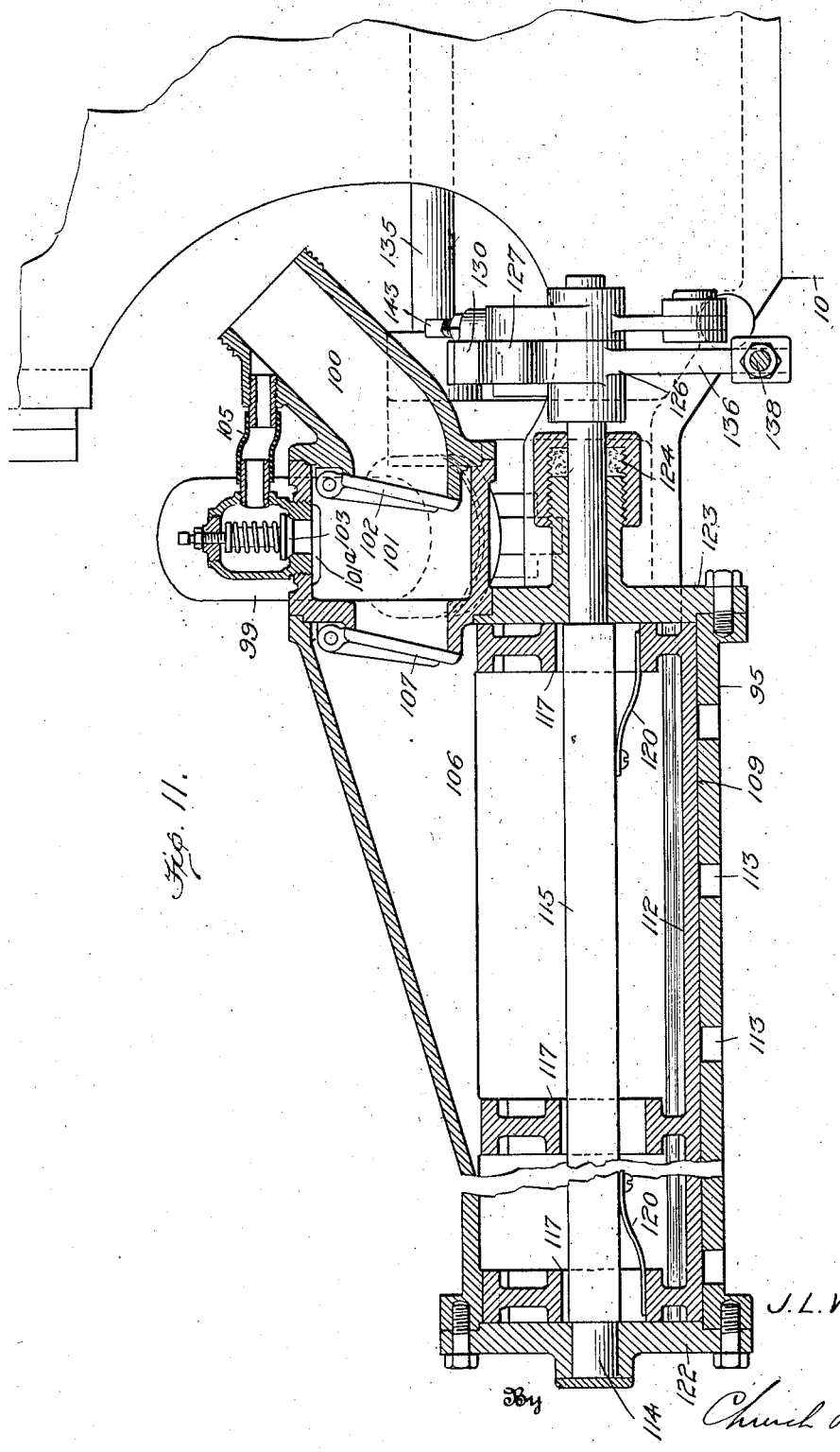

March 2, 1926.
J. L. W. RACH
1,575,301
BAKING MACHINE
Filed August 12, 1922    13 Sheets-Sheet 11
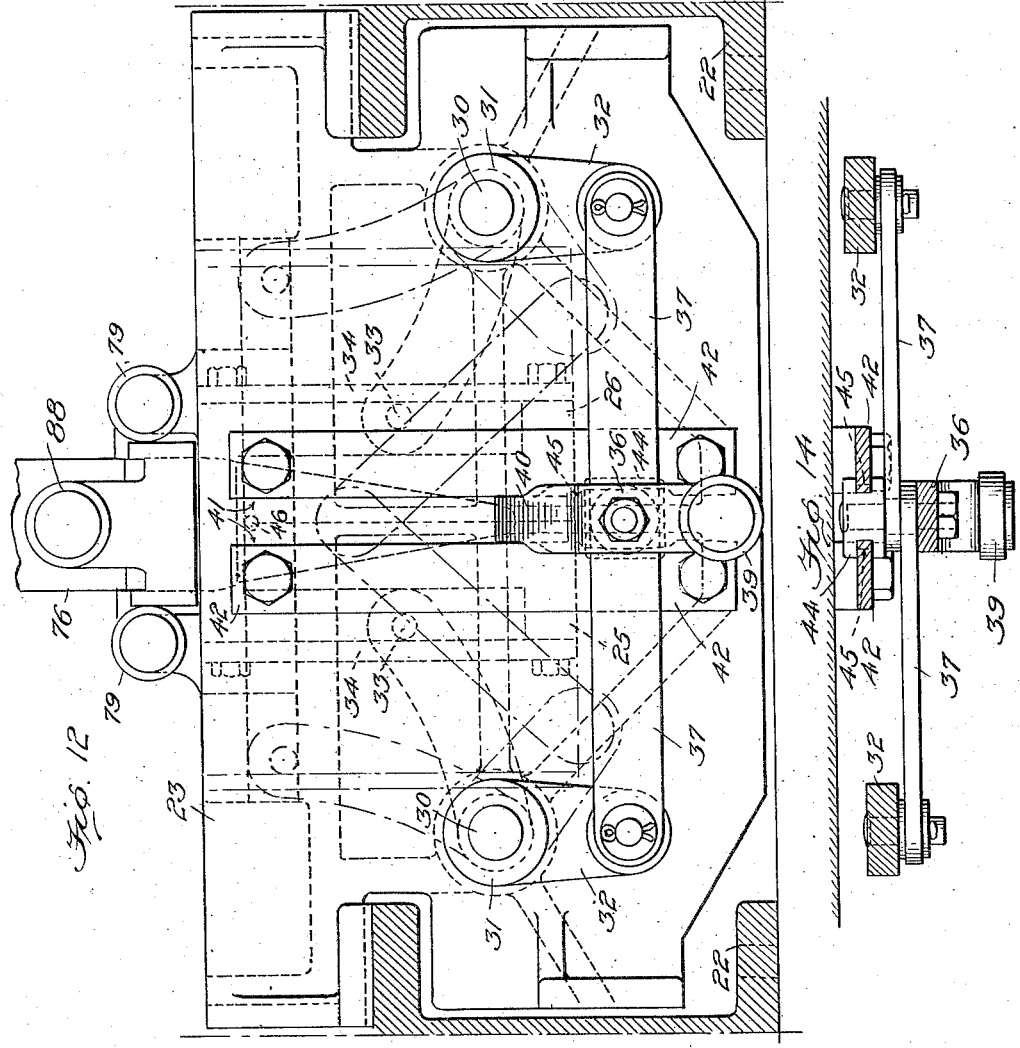
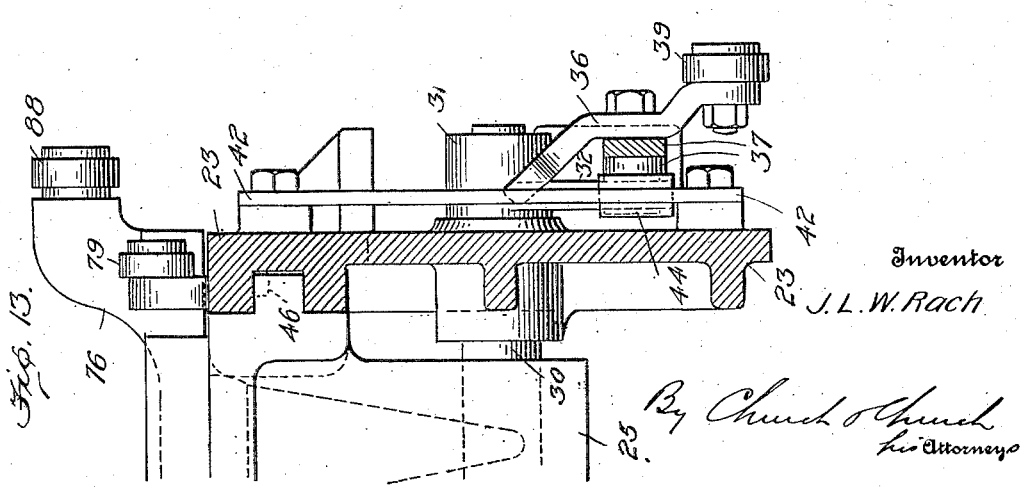
Inventor
J. L. W. Rach
By Church & Church
His Attorneys March 2, 1926. 1,575,301
J. L. W. RACH
BAKING MACHINE
Filed August 12, 1922  13 Sheets-Sheet 12

Inventor
J. L. W. Rach
By
his Attorney

March 2, 1926.
J. L. W. RACH
BAKING MACHINE
Filed August 12, 1922
1,575,301
13 Sheets-Sheet 13
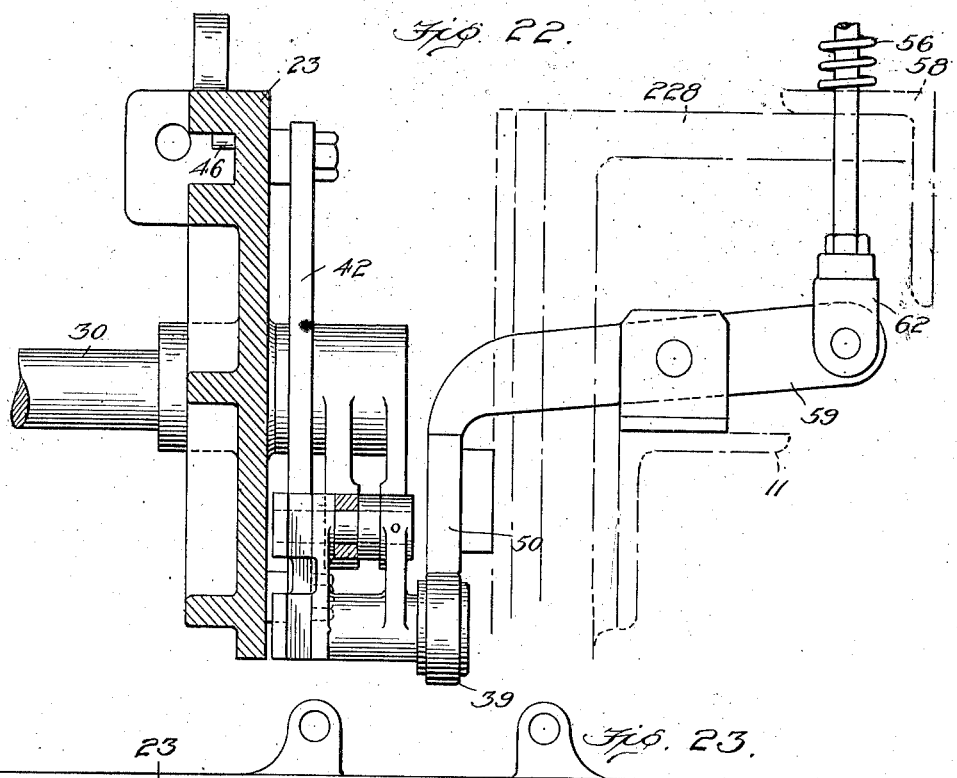
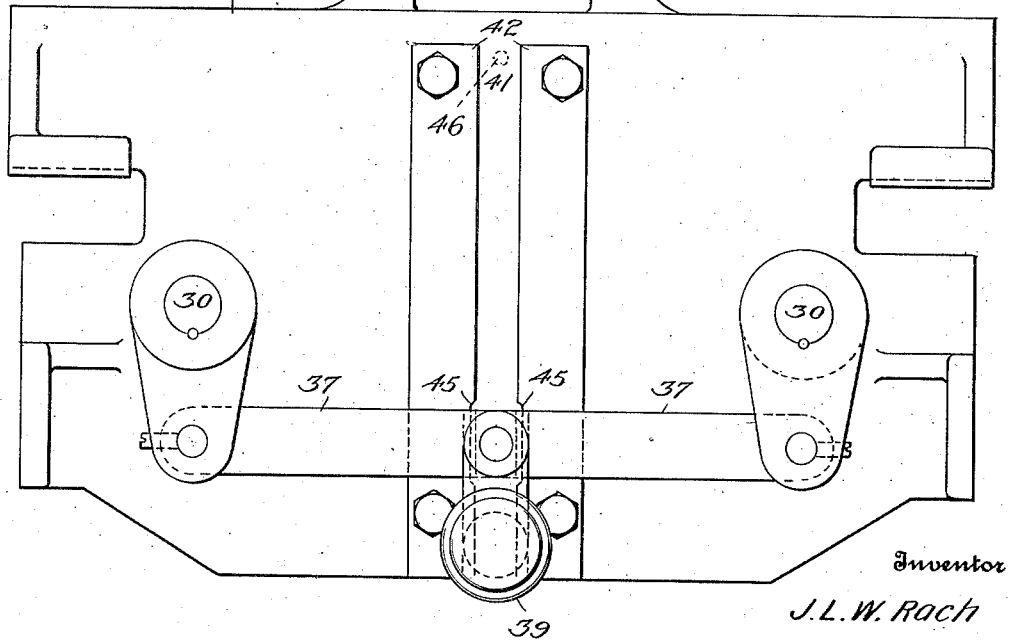
Inventor
J. L. W. Rach Patented Mar. 2, 1926.

1,575,301

UNITED STATES PATENT OFFICE.

JOHN LOUIS WILLIAM RACH, OF BALTIMORE, MARYLAND, ASSIGNOR TO MARYLAND BAKING COMPANY, OF BALTIMORE, MARYLAND.

BAKING MACHINE.

Application filed August 12, 1922. Serial No. 581,420.

*To all whom it may concern:*

Be it known that I, JOHN LOUIS WILLIAM RACH, a citizen of the United States, residing at Baltimore, in the State of Maryland, have invented certain new and useful Improvements in Baking Machines; and I do hereby declare the following to be a full, clear, and exact description of the same, reference being had to the accompanying drawings, forming part of this specification.

This invention relates to baking machines in general and particularly to baking machines for making small pieces of pastry. In the specific embodiment illustrated herein the invention is shown as applied to a machine for baking ice cream cones.

The principal object of the present invention is to improve and simplify generally the various mechanisms of present pastry backing machines with a view to securing a greater output of the machine as well as to lessen the cost of baking and to avoid as far as possible any need for manual control of any part of the mechanism.

In the drawings,—

Fig. 2 is a section through the machine at the feeding point.

Fig. 3 is a similar section taken at the baking and pressing point.

Fig. 4 is a section showing the drive mechanism.

Fig. 6 is a side view of a portion of the machine to illustrate primarily the trackway for elevating, lowering and joggling the cores.

Fig. 7 is an elevation of the discharge mechanism.

Fig. 8 is an elevation of the mold opening cam mechanism.

Fig. 9 is a vertical section illustrating the ejecting and trimming mechanism.

Fig. 10 is a side elevation of the feed box and its connected mechanism.

Fig. 11 is a vertical section through the feed box to illustrate more clearly the connection between the valve and its stem.

Fig. 12 is an elevation showing the mold closing mechanism.

Fig. 13 is an edge view thereof.

Fig. 14 is a horizontal section taken just above the connecting links shown in Fig. 12.

Fig. 15 is an elevation showing the sections of the yielding trackway.

Figs. 20 and 21 are views showing the details of the valve for controlling the feed of batter to the molds.

Figs. 22 is a vertical elevation showing particularly the cooperation between the yielding trackway, the roller controlled thereby and the spring pressed levers for holding the track aganist said rollers.

Fig. 23 is an elevation of the mold closing mechanism.

Fig. 24 is an elevation of the gate for controlling the passage of cones to the conveyor belt.

Figure 1:
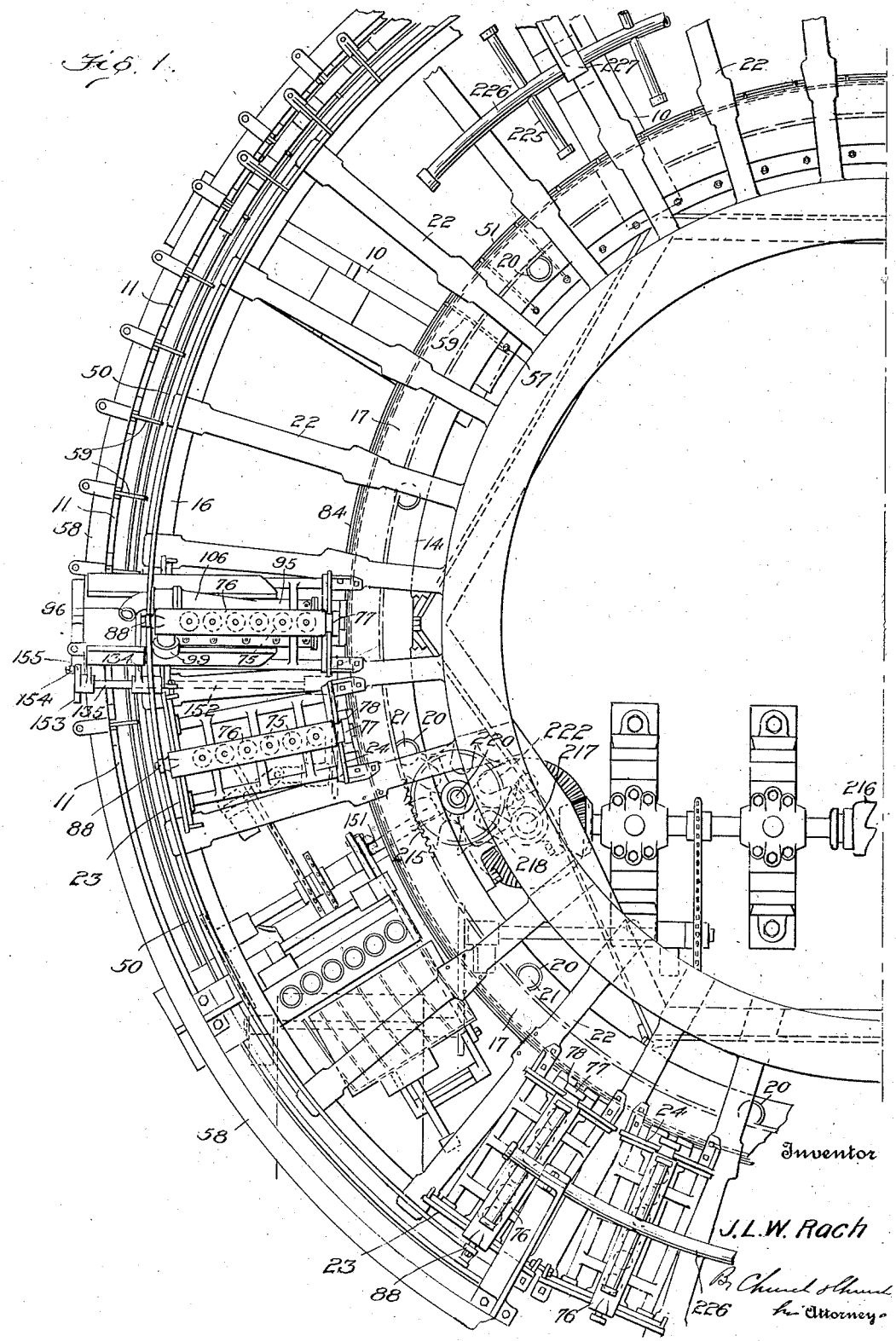
Figure 1 is a plan view of a portion of the machine.
Figure 5:
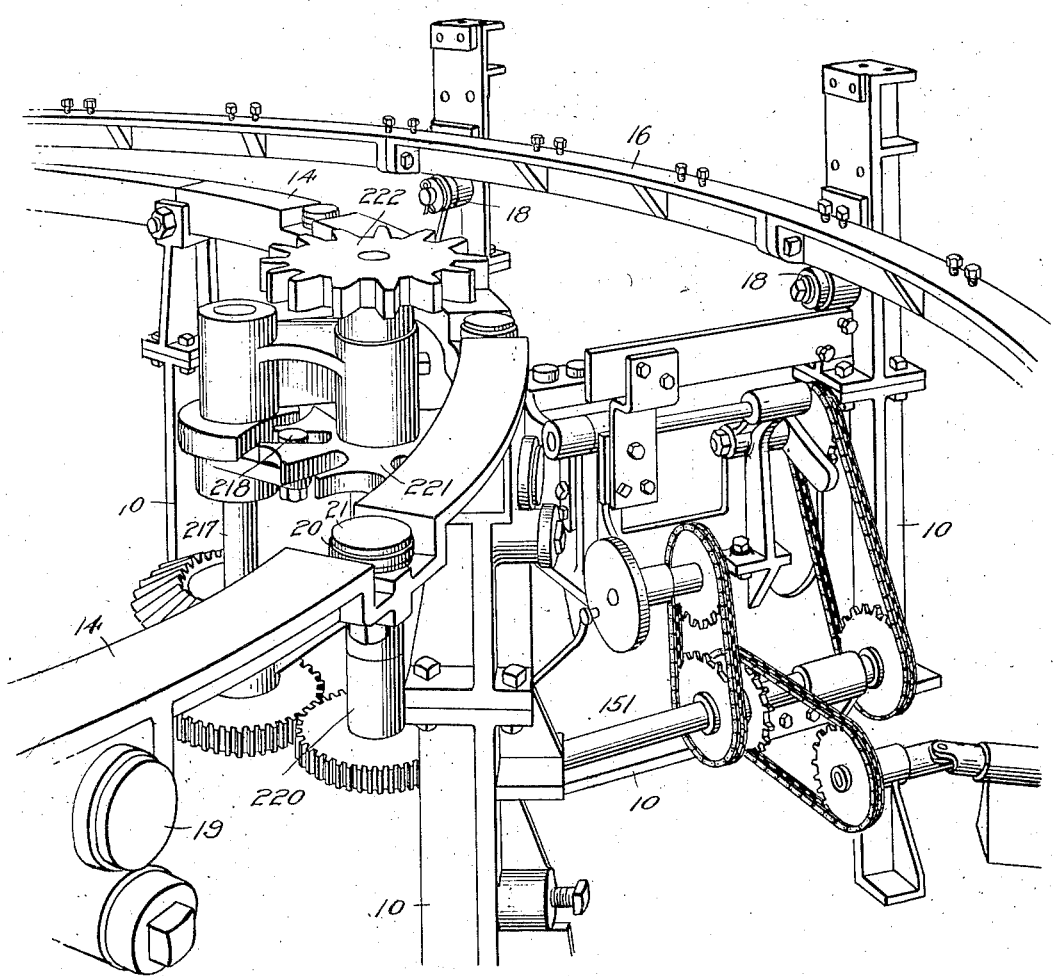
Fig. 5 is a perspective view of the stationary frame of the machine with the revolving carrier and other parts omitted.
Figure 17:
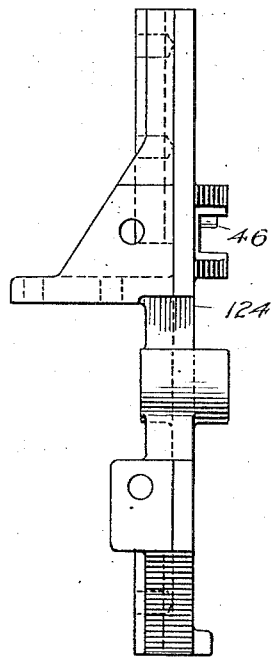
Figs. 16 to 19 are views of the head of the molds.
Figure 16:
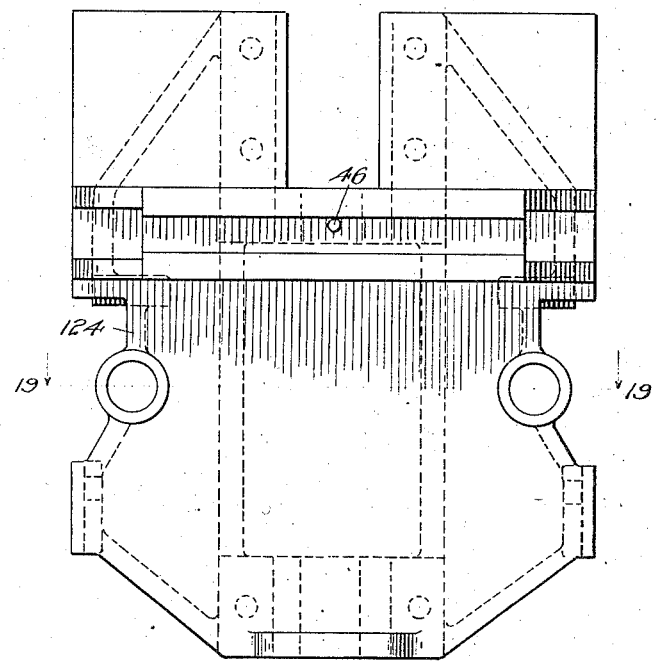
Figure 18:
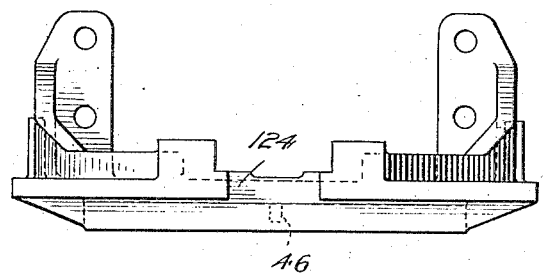
Figure 19:
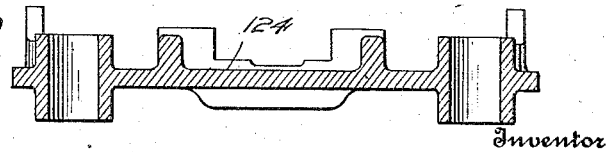

The machine consists generally of a revolving member supported and guided by a stationary annular frame; the revolving member carrying the molds, while the stationary frame carries the heating elements and the feeding and ejecting means.

The stationary frame includes a plurality of radial stools 10 secured together by the arcuate segments 11 which form the outer stationary ring 12 of the machine and by the ring 14 which may be an integral annular member, but preferably is composed of a plurality of similar segments 15 as shown.

The rotating member is an annular structure supported on an outer ring 16 and an inner ring 17, the outer ring 16 resting upon rollers 18 carried by the stools 10 and the inner ring being supported by similar rollers 19 and being guided by the rollers 20 rotatably mounted on vertical studs 21 carried by the stationary inner ring 14 midway between each stool, the rollers 19 being preferably carried by the stools.

The purpose of the rollers 20 is to correctly center the revolving member or carrier on the stationary annular frame while at the same time permitting free expansion when the machine is heated, the rollers 18 and 19 being fairly wide to accommodate the increase in diameter due to temperature changes.

The two concentric rings 16 and 17 of the revolving carrier are connected together by a plurality of radial members 22 which carry between them the outer and inner plates 23 and 24 which guide and support the mold sections 25 and 26.

The molds as just stated consist of two similar cooperating plates 25 and 26 having a plurality of registering cavities 27, preferably six in number, for forming the cones these sections being operated toward and away from each other by means of the three cam lugs 28 on each of the two crank shafts 30 journaled in the end plates 23 and 24, projecting entirely through the former and receiving on their extended ends the hub portions 31 of the crank arms 32 through which the crank shafts 30 receive their motion to close the two mold sections by direct contact of the cam lugs with the mold pieces themselves, and to open the mold by contact of the rod 33 carried by the three cam lugs 28 with the two strips 34 secured to each mold section.

The crank arms 32 are connected to the vertically moving cross head 36 by means of the links 37 so that as the cross head is lowered the mold is closed and as the cross head 36 is elevated the crank arm will cause the two sections to separate. In certain machines I prefer to close the molds by raising the cross head but this is a mere obvious reversal of parts and is therefore not illustrated. The cross head 36 carries at its lower end a roller 39 and at its upper end is narrow and bent as at 40 to fit in the slot 41 between the two parallel guides 42 mounted on each of the outer plates 23 in which slot the flanged roller 44 of the cross head 36 moves.

The slot 41 is enlarged at 45 to allow for lateral play so that when the flanged roller 44 reaches its lowest point it may be moved laterally in case that one of the two mold sections has entirely closed while the other has not quite reached mid-position. This feature has been thoroughly tested and has added materially to the smooth action of the device, and effects accurate position closure of the molds.

It has been found preferable to have pins such as 46 on the inner side of the plates 23 and 24 so that neither of the two mold sections can pass center or mid-position, this rendering necessary some method for insuring that one mold section may close after the other in case one of them is somewhat worn and fails to reach center at the same moment as its companion piece.

The mold sections are locked in the closed position by the arrangement of links and cranks as shown or may be yieldingly held closed by means of a trackway 50 composed of a plurality of segments 51 which bear in turn against the roller 39 which passes beneath this trackway as best seen in Fig. 3. On the base of the machine, formed by the radial stools, is secured a plate or cylinder 52 which is provided with a plurality of studs 53 which pass through vertical slots 54 in each of the segments 51 of the track, thus drawing the segments close to the cylindrical plate or ring 52 and while preventing lateral movement leaves the segments of the track free to move up and down save for the pressure exerted by the springs 56 here illustrated as compression springs mounted on a headed bolt 57 passing freely through an angle iron 58 carried by the radial stools and pivotally connected to the lever 59 which is pivoted to the curved angle iron 11 which forms the outer stationary ring 12 of the machine.

The amount of pressure exerted by the spring 56 on the segmental track 50 may be altered by manipulation of the lock nut 61 and threading the bolt 57 into and out of the socket member 62. It has been found unnecessary to provide a duplicate trackway such as the trackway 50 on the opposite side of the mold sections due to the fact that the shafts 30 extend through both end plates of the mold and seem in practice to close the distant ends of the mold sections as tightly as the ends of the molds nearest the track.

The mechanism for opening the mold sections is best seen in Fig. 8. The shaft 65 carries a cam cylinder 66 having a cam slot 67 in its upper portion. In this slot travels a roller 68 on the end of a bell crank lever 69 connected by link 70 to a second bell crank lever 71 which lies in the path of the roller 39 on the cross head 36. Upon actuation of the roller 68 by movement of the cam 66 the roller 39 will be raised and the two mold sections separated.

It will be noted that the mold sections will remain separated when the roller 39 is elevated until such time as the roller 39 is again brought under the yielding trackway 50 and it will also be noted that the opening mechanism may be operated either while the mold carrier is still or is moving.

The cores 75 which form the inner shape of the pastry in accordance with the usual practice are six in number and are mounted on a horizontal bracket or core holder 76 which is integral with, or preferably secured to, the relatively long vertical slide bars 77 which slide vertically in a slot 78 formed in the back plates 24 of the mold sections. To insure absolute registry of the brackets or core holders 76 a pair of rollers 79 are mounted in the opposite plate 23 of the mold and guide same to correct position.

At the lower end of each slide bar 77 is a roller 82 preferably carried on a stud 83, this roller being operated by a trackway 84 formed of four portions, respectively, an elevating portion 85, a lowering portion 86, a reciprocating portion 87, and a pressure portion 88, the latter being quite similar to the trackway 50 for yieldingly holding the mold sections closed.

At the end distant from the slide bar 77 the core holders 76 each carry a roller 88 which travels in a trackway similar to that which governs the movement of the roller 82 being in fact a duplicate of that trackway making the usual allowances for the different diameters of the trackway, etc.

The roller 82 in passing up the inclined portion 85 of the trackway raises the cores to a considerable height above the molds in order to clear the mechanism by which the batter is fed into the molds, which mechanism will be described in a later paragraph. After the molds have been filled the cores are lowered by engagement of the roller 82 with the downwardly inclined double track 86 which, however, does not permit the cores to descend to their lowermost position but nearly thereto.

The roller 82 next passes between the track portions 87 which are scalloped to form a zigzag path causing the cores to raise and lower a number of times thus permitting escape of the steam generated in the batter by the hot molds. It has been found that if the cores descend to their lowermost point without this reciprocation to allow for the escape of the steam, the walls of the cones are frequently made thin, and otherwise imperfect cones are sometimes formed.

The roller 82 next passes to the pressure portion 88 of the track, this portion as stated being formed of a number of rhomboidal segments 51 each secured to a cylinder 52 by collared studs 53 passing through slots 54 in the segments and being secured to the cylinder or ring 52 thus permitting free movement of the segments up and down while preventing all lateral movement. As in the track 50 each of the segments 51 of the trackway 88 are pressed down by two independent levers 59 the free end of which bears on the top edge of the segment 51 while the other end is attached to a spring 56 giving a pressure which is adjustable to the requirements of the machine by adjusting the bolts 57.

Since each of the springs are separately adjustable it is possible to apply any desired pressure at any portion of the baking period and if desired the pressure instead of being uniform throughout the entire pressure portion of the track, may be adjusted so as to be gradually increasing or gradually decreasing as may be desired. The roller 88, as previously stated, passes through, and is controlled by, a trackway substantially identical with the trackway just mentioned.

The feeding mechanism is shown in Figs. 2 and 10. The feed box 95 in its simplest form takes batter by gravity from the pipe 96 which leads down from the batter supply tank 97. It is preferable, however, that the batter shall be supplied under constant pressure and in the preferred construction the batter is fed by a pump 99 to the pipe 100 which leads to an opening 101ª in a small chamber 101 having a check valve 102 at one entrance thereof and having a spring pressed valve 103 at the top to permit batter to escape back to the pipe 100 through the by-pass 105 when a definite pressure has been reached in the main chamber 106 of the feed box. A second check valve 107 controls passage of batter from the small receiving chamber 101 to the main chamber 106 of the feed box.

Within the cylindrical bore 109 of the feed box 95 is a valve 111 which has a cylindrical portion 112 to close the orifices 113 through which the batter is discharged into the cavities of each of the molds. The valve 111 is secured to a shaft 114 preferably by having the engaging portion 115 of the shaft non-circular, oblong for example, and having the valve arms 117 of corresponding shape but allowing considerable play or up and down movement so that as the valve wears, it will still give a water tight joint, being constantly urged towards the lower portion of the feed box in which is located the opening 113ˣ by means of a plurality of springs 120 attached to the underside of the feed box shaft 114 and pressing against the lower faces of the rectangular openings in the valve arms thus forcing the valve against the seat part of the feeding box.

The valve stem or shaft 114 is journaled in the removable end 122 of the feed box 95 and passes through the pump end head 123 and through a gland 124 to prevent leakage. At its free end the stem 114 carries a lever 126 forming at its upper part a cam 127 having an abrupt shoulder or hook 128 which engages the long pawl 130 adjustably connected to the lower arm 132 of the bell crank lever 134 mounted on the shaft 135. The lower crank-like arm 136 of the lever 126 is pivoted to a rod 138 slidably mounted in a depending lug 139 which also serves as a stop for the spring 140 which tends at all times to close the valve 111.

As the pawl reciprocates to the left, as shown in Fig. 10, it rides up the cam surface 127 and finally engages the hook 128 thereby opening the valve 111 against the pressure of the spring 140. On continued oscillation of the shaft 135 an adjustable screw 143 on the pawl 130 engages the cam surface 127 and finally lifts the pointed end 144 of the pawl 130 out of contact with the hook 128 and allows the spring 140 to close the valve 111 with a sharp and almost knife-like blow, thus insuring an extremely accurate regulation of the supply of batter to the molds.

The stop screw 146 is adjustable as are the screws 143 and 148 each of these three being provided with lock nuts to insure against them working loose. By means of these screws it has been found that the supply of batter to be discharged may be regulated with extreme accuracy, the sharpness of action of the closing mechanism due to the strength of the spring 140 permitting the most minute regulation.

When the latter is supplied to the filling box by gravity alone the pressure in the box is regulated by altering the height of the batter tank of the feed box and while this has been found very satisfactory in practice it is somewhat preferable to use the forced pressure through the plunger pump 99. As previously stated this pump is operated from the shaft 135 shown to the right of Fig. 10 which shaft is driven from the main shaft by gearing of usual and well known type including the bevel gear 150 (see Fig. 6) on shaft 151 which is connected to shaft 152 by means of a plurality of sprocket and chain connections. The shaft 152 carries at one end a crank disk 153 to which is pivoted the connecting rod 154 which is pivoted at its upper end to a crank 155 on the shaft 135.

The ejecting mechanism is best shown in Figs. 8 and 9. The bracket 160 carries a hollow box 161 suspended by means of a plurality of bolts 162 each surrounded by a spring 163 to hold the box spaced in the bracket. On the lower face of the hollow box and communicating with the chamber therein are six hollow plugs 164 intended to steady the baked cones when the molds are opened, these plugs each being provided with a number of air holes 166 to allow for escape of compressed air delivered to the hollow box 161 through the pipe 167 from a source of compressed air (not shown) so that this air ejects the cones should they have a tendency to stick to the cones. Surrounding each plug 164 is an annular cutter 168 adapted to cut the excess batter from each cone separating the cones at this time from one another. While the machine is shown as baking six cones to a mold it is obvious that any other number of cones may be baked.

Movement of the bracket 160 is accomplished through the cam 66 which in addition to the previously mentioned groove 67 has a lower cam channel 173 in which travels a roller 174 mounted on one end of the bell crank lever 175 pivoted to the frame as at 176 and connected to a second bell crank lever 177 by means of the connecting link 178. The free end of the lever 177 is provided with a slot 180 which receives a pin 181 on the slide 182 the latter being secured at its upper end to the bracket 160. The slide 182, the bracket 160, and the associated mechanisms are balanced by a counterweight 183 adjustably mounted on a pivoted arm 184 carried by the frame work.

The supply of compressed air to the plugs 164 is controlled by a spring closed valve 185 which is opened by means of the rod 186 pivoted to the lever 187 the movement of which is controlled by the disk cam 188 keyed to the top of the shaft 65. The pivoted arm or striker 190 clears the opened molds of any cones that might have lodged themselves between the molds due to the ejection operations not properly functioning. Said arm 190 is pivoted at 191 and is rocked up and down on its pivot by an arm 192 pivoted to it at 193 and made fast to 182 at 194.

The trimmed cones pass from the cutting mechanism to a plurality of chutes 189, six in number, to correspond with the six cavities of each mold, and are brought to rest, point down, against the hinged gates 201 pivoted to the frame as at 202 and each pivotally connected to a cooperating link 203 which in turn is pivoted to an arcuate arm pivoted as at 205 to a stationary portion of the structure.

The conveyor belt 207 which passes over the cylinder pulley 209 is wider than the molds and passes beneath each of the six hinged gates operating them in turn by means of a plurality of spaced trippers 211 adapted to operate with the hinged gates one at a time in regular order as soon as six or twelve cones have been received in the chute controlled by such gate. As best shown in Fig. 7 the trippers 211 strike the arcuate arms lying in its path throwing the hinged gates to the left as shown in that figure and discharging the six or twelve stacked cones to the discharge belt.

The annular revolving member carrying the mold sections is provided with an annular rack 215 on the inner face of the inner ring of the revolving carrier. The power for driving the machine is preferably furnished by an electric motor 216 which drives the main vertical drive shaft 217 carrying at its upper end a roller 218 which drives the parallel auxiliary shaft 220 by means of a Geneva wheel 221.

The auxiliary shaft 220 carries at its upper end a drive pinion 222 which meshes with the annular rack 215 carried by the revolving frame thus giving the revolving carrier an intermittent movement while the main drive shaft 217 and the mechanism connected therewith are constantly in motion.

The molds are preferably heated on their tops by means of gas delivered to jets 225 carried directly by the upper gas pipe 226 which pipe is supported by the curved brackets 227 bolted to the upper standards 228 of the radial stools and are heated on their lower surfaces by a similar arrangement of parts consisting of jets 236 connected to the lower gas pipe 237 which latter is supported by the posts 232 secured to the lower central seats 233 on the radial stools 10.

The tripper plate 240 (see Fig. 7) is an optional member which serves to slightly open the molds or rather to raise the roller 39 so that its axis is slightly above the axes of the pivotal connections between the links 37 and the cranks 32. This movement of roller 39 will move arms 28 and rod 33 up against plates 34. The guides 241 and 242 immediately engage roller 39 and serve a similar purpose providing between them a path for the roller 39 which causes first an opening and then a closing of the molds, this closing movement being accomplished with a snap, so to speak, and serving to jar the molds thereby releasing the baked cones so that they will the more readily leave the mold sections when the latter are completely opened by the bell crank lever 71 which is thus relieved of a portion of its work and is given a corresponding longer life.

A brief description of the cycle of operations will now be given. Assuming that the parts are in the position shown in Fig. 2, the valve 112 will be actuated by the cam 188, etc., (Fig. 8) to fill the set of molds which are then closed. As this set of molds progress around the table, the cores will be first brought down into the molds by roller 82 engaging track 84 and then jiggled, so to speak, by portion 87 of said track (Fig. 6) to permit the escape of steam. The cores are then yieldingly held in the molds while the latter move step by step around the table in proximity to the gas jets. It will be understood that as each set of molds comes successively to its filling position, it will be likewise filled and moved on. After the mold has passed the jets the roller 39 engages the plate 240 and then the guides 241, 242 which will slightly open and then snap the mold closed to jar the baked cones loose from their cores (Fig. 7). Roller 82 then comes into engagement with that portion of its track which will gradually raise the cores 75, out of the molds to a position where they can pass above the dummy cores 164 and the filling mechanism. After the cores 75 have been thus raised and before the molds are opened, the dummy cores 164 are inserted in the cones and molds after which the molds are opened by roller 39 being elevated to raise the toggle links 37 which will actuate the bell crank levers on shafts 30 to throw the arms 28 (shown best in Figs. 2, 3 and 12) and the mold sections apart. Compressed air is then ejected from the dummy cores 164 to insure the cones dropping down into the chutes 189.

What I claim is:

1. A baking machine of the type using a plurality of molds each composed of two sections and a cooperating core member, said core being raised and lowered by roller controlled means and said molds being opened and closed by roller controlled means; characterized by the provision of a yielding track for each of said rollers.

2. A baking machine of the type using a plurality of molds each composed of two sections and a cooperating core member, said core being raised and lowered by roller controlled means and said molds being opened and closed by roller controlled means; characterized by the provision of a track for one of said rollers which includes a plurality of cooperating yielding sections.

3. A baking machine of the type using a plurality of molds each composed of two sections and a cooperating core member, said core being raised and lowered by roller controlled means and said molds being opened and closed by roller controlled means; characterized by the provision of a track for one of said rollers which includes a plurality of cooperating yielding sections, each of said sections being rhomboidal in elevation.

4. A baking machine of the type using a plurality of molds each composed of two sections and a cooperating core member, said core being raised and lowered by roller controlled means and said molds being opened and closed by roller controlled means; characterized by the provision of a track for guiding one of said rollers, said track including a plurality of rhomboidal guiding plates each slotted to receive a plurality of supporting studs to limit motion of said plates, and a plurality of spring pressed levers bearing against one edge of each of said rhomboidal plates.

5. A baking machine of the type using a plurality of molds each composed of two sections and a cooperating core member, said core being raised and lowered by roller controlled means and said molds being opened and closed by roller controlled means; characterized by the provision of a vertically yielding trackway for one of said rollers including a stationary supporting ring, a plurality of studs carried thereby, a plurality of guiding plates slotted to receive said studs, a plurality of lever arms pivoted to said plates and pivoted to a stationary portion of the supporting frame of the machine, and yielding means for holding said plates at one limit of their vertical travel.

6. A baking machine of the type using a plurality of molds each composed of two sections and a cooperating core member, said core being raised and lowered by roller controlled means and said molds being opened and closed by roller controlled means; characterized by the provision of a vertically yielding trackway for one of said rollers including a stationary supporting ring, a plurality of studs carried thereby, a plurality of guiding plates slotted to receive said studs, a plurality of lever arms pivoted to said plates and pivoted to a stationary portion of the supporting frame of the machine, and yielding means for holding said plates at one limit of their vertical travel, each of said guiding plates consisting of a member rhomboidal in vertical elevation and said plates being located closely adjacent each other whereby when one of said plates is moved against the tension of the spring it will cause the proximate edge of the next adjacent plate to move with it.

7. In a baking machine of the type employing a plurality of molds and a plurality of core members cooperating therewith, said core sections being movable vertically with respect to its cooperating mold; characterized by the provision of a trackway for raising and lowering said core sections, said trackway having an upwardly inclined portion for raising said cores, a downwardly inclined portion for lowering said cores and a scalloped portion formed by a series of undulations immediately adjacent said downwardly inclined section for causing a repeated reciprocation of the cores following the closing of the mold sections.

8. In a baking machine of the type employing a plurality of molds and a plurality of core members cooperating therewith, said core sections each being movable vertically with respect to its cooperating mold; characterized by the provision of a trackway for one side of said core sections for raising and lowering said core sections, said trackway having an upwardly inclined portion for raising said cores, a downwardly inclined portion for lowering said cores and a scalloped portion immediately adjacent said downwardly inclined section for causing a repeated reciprocation of the cores following the closing of the mold sections, and a similar trackway for the other end of said core sections.

9. In a baking machine of the type employing a plurality of molds and a plurality of core members cooperating therewith, said molds each consisting of two similar sections movable horizontally with respect to each other, and said core sections being movable vertically with respect to its cooperating mold; characterized by the provision of a trackway for opening and closing said mold sections, a trackway for operating said core sections, said trackway having in order a section for raising said cores, a section for lowering said cores, a section for imparting a plurality of rapid reciprocations to said cores to allow for the escape of steam, and a plurality of yieldingly mounted sections for holding said core sections in said molds.

10. In a baking machine of the type employing a plurality of molds and a plurality of core members cooperating therewith, said molds each consisting of two similar sections movable horizontally with respect to each other, and said core sections being movable vertically with respect to its cooperating mold; characterized by the provision of a plurality of trackways for opening and closing said molds and a plurality of additional trackways each consisting of a section for raising said cores, a section for lowering said cores, a section for imparting a plurality of rapid reciprocations to said cores and to allow for the escape of steam, and a plurality of yieldingly mounted sections for holding said core sections in said molds.

11. In a baking machine of the type employing a plurality of molds, said molds each consisting of two similar sections movable horizontally with respect to each other; characterized by the provision of a toggle mechanism for opening and closing said mold sections, a cross bar pivoted to and operating said toggle mechanism, a roller on said cross bar and a yielding trackway for guiding said roller to open and close said molds.

12. In a baking machine of the type employing a plurality of molds, said molds each consisting of two similar sections movable horizontally with respect to each other; characterized by the provision of a toggle mechanism for opening and closing said molds, a cross bar pivoted to and operating said toggle mechanism, a roller on said cross bar and a yielding trackway for guiding said roller to open and close said molds, said trackway consisting of a plurality of rhomboidal plates each mounted to permit of vertical movement while preventing lateral movement and a plurality of spring pressed levers for holding said plates at one limit of their travel thus yieldingly holding said molds in closed position.

13. In a baking machine of the type employing a plurality of molds, said molds each consisting of two similar sections movable horizontally with respect to each other; characterized by the provision of toggle means for opening and closing said molds, a cross bar pivoted to said toggle mechanism and carrying a guiding roller, a plurality of members for guiding said roller and providing a slot having substantially parallel sides throughout its extent but having a slight clearance at the position the roller takes when the molds are closed, whereby when one mold section completes its movement slightly in advance of the other the guiding roller may move laterally to cause the remaining mold section to complete its movement to close the mold.

14. In a baking machine of the type employing a plurality of molds, said molds each consisting of two similar sections movable horizontally with respect to each other; characterized by the provision of a closing mechanism for molds consisting of a pair of shafts having parallel axes, a plurality of cam members on each shaft and adapted to engage said mold sections on opposite sides, a crank arm carried by each shaft, a cross head, a link pivoted to each crank arm and to said cross head, a pair of guides forming between them a slot, a flanged guiding roller travelling in said slot, a lateral extension on said cross bar and also travelling within said slot, and a roller carried by said cross arm and adapted to travel on a trackway.

15. In a baking machine of the type employing a plurality of molds and a plurality of core members cooperating therewith, said molds each consisting of two similar sections movable horizontally with respect to each other, and said core sections being movable vertically with respect to its cooperating mold; characterized by the provision of a closing mechanism for molds consisting of a pair of shafts having parallel axes, a plurality of cam members on each shaft and adapted to engage said mold sections on opposite sides, a crank arm carried by each shaft, a cross head, a link pivoted to each crank arm and to said cross head, a pair of guides forming between them a slot, a guiding roller travelling in said slot, and a roller carried by said cross arm and adapted to travel on a trackway, each of said guides having an indentation at the point of extreme travel of said guiding roller to provide for clearance and lateral movement of said guiding roller in such position.

16. In a baking machine, a mold, a core adapted to cooperate with said mold, a carrier bar for said core, a slide bar secured to one end of said carrier bar, means for raising and lowering said slide bar, and a plurality of guiding rollers on said mold for guiding the free end of said carrier bar.

17. In a baking machine, a mold, a core adapted to cooperate with said mold, a carrier bar for said core, a slide secured to one end of said carrier bar, a roller on the lower end of said slide bar, a trackway for said roller, a roller on the free end of said carrier bar, and an independent trackway for said second mentioned roller.

18. In a pastry baking machine of the type employing a plurality of molds carried by a rotating carrier, a receiving chute, a plurality of partitions providing a number of channels equal in number to the number of pastries baked in each mold, a gate for each channel the gate and bottom of each channel jointly supporting the pastries, a conveyor belt, and means carried by said belt for moving said gates one at a time from beneath the lower end of the channels to discharge the pastries in said channels and deliver them to said belt.

19. In a pastry baking machine of the type employing a plurality of molds carried by a rotating carrier, a receiving chute, a plurality of partitions providing a number of channels equal in number to the number of pastries baked in each mold, a gate for each channel the gate and bottom of each channel jointly supporting the pastries, a conveyor belt, and means carried by said belt for moving said gates one at a time from beneath the lower end of the channels to discharge the pastries in said channels and deliver them to said belt, said means being so located that each gate is operated after discharge of as many molds as there are pastries in each mold.

20. In a pastry baking machine, a discharge chute, a hinged gate closing the lower end of said chute, a conveyor beneath said chute, a curved extension on said gate for guiding the pastries to said belt when said gate is moved to position to permit passage of pastries from said chute to said belt, and means for moving said gate.

21. In a discharge mechanism for ice cream cones, a chute for said cones, a hinged gate beneath the lower end of said chute, a pivoted arm connected to said gate, a conveyor, means carried by said conveyor to strike said arm to move the gate from beneath the end of the chute and release the cones in said chute, and means carried by said gate for directing said cones from the chute to the belt.

22. In a pastry baking machine of the type employing a plurality of molds each composed of a plurality of sections, an ejector mechanism consisting of a plurality of plugs adapted to fit within the baked pastries in the molds, a source of compressed air, a pipe leading from said source to said plugs, a valve in said pipe, and means operable after the mold sections have opened for operating said valve to deliver air to said plugs.

23. In an ejecting mechanism for cone baking machines, a plurality of molds each consisting of a plurality of sections, mechanism carried by each mold for separating said sections, cam-operated means for opening said molds through said mechanism, a plurality of cutting mechanisms, a support therefor, a plurality of plugs carried by said support concentrically with said cutters, cam-operatd means for raising and lowering said support, and means for discharging said cones from said plugs after the molds have been opened.

JOHN LOUIS WILLIAM RACH.